(12) United States Patent
Connors et al.

(10) Patent No.: US 9,426,940 B2
(45) Date of Patent: Aug. 30, 2016

(54) DIRECT VACUUM SEED METERING SYSTEM AND METHOD (71) Applicant: CNH Industrial America LLC, New Holland, PA (US)

(72) Inventors: Michael J. Connors, Lockport, IL (US); Johnathon R. Dienst, DeKalb, IL (US); Scott A. Long, Plainfield, IL (US); Marvin A. Prickel, Homer Glen, IL (US); Grant T. MacDonald, Ames, IA (US)

(73) Assignee: CNH Industrial America LLC, New Holland, PA (US)

( * ) Notice: Subject to any disclaimer, the term of this patent is extended or adjusted under 35 U.S.C. 154(b) by 22 days.

(21) Appl. No.: 14/540,810

(22) Filed: Nov. 13, 2014

(65) Prior Publication Data
US 2016/0135362 A1 May 19, 2016

(51) Int. Cl.
G06F 7/70 (2006.01)
A01C 7/10 (2006.01)
A01C 7/04 (2006.01)

(52) U.S. Cl.
CPC .............. A01C 7/102 (2013.01); A01C 7/046 (2013.01); A01C 7/105 (2013.01)

(58) Field of Classification Search
CPC ....... A01C 7/102; A01C 7/046; A01C 7/105
USPC .................... 701/50; 111/149, 185
See application file for complete search history.

(56) References Cited

U.S. PATENT DOCUMENTS

| 5,325,801 | A | 7/1994 | Fiorido |
| 6,003,455 | A | 12/1999 | Flamme et al. |
| 6,145,455 | A | 11/2000 | Gust et al. |
| 6,481,647 | B1 | 11/2002 | Keaton et al. |
| 6,622,646 | B1 | 9/2003 | Bennett et al. |

(Continued)

FOREIGN PATENT DOCUMENTS

| CN | 201403306 Y | 2/2010 |
| CN | 202773294 U | 3/2013 |
| WO | 2012142558 A1 | 10/2012 |

OTHER PUBLICATIONS

"Early Riser Planter Jumpstart;" Case IH Agriculture; Dec. 31, 2012; p. 43.

Primary Examiner — Thomas G Black
Assistant Examiner — Luke Huynh
(74) Attorney, Agent, or Firm — Rebecca L. Henkel (57) ABSTRACT One embodiment describes a seed metering system that includes a first seed meter that controls seed deposition by a first row unit on a seed planting implement; a first direct vacuum source fluidly coupled to the first seed meter, in which the first direct vacuum source supplies vacuum pressure only to the first seed meter to enable the first seed meter to control seed deposition by the first row unit; a second seed meter that controls seed deposition by a second row unit on the seed planting implement; a second direct vacuum source fluidly coupled to the second seed meter, wherein the second direct vacuum source supplies vacuum pressure only to the second seed meter to enable the second seed meter to control seed deposition by the second row unit; and a control unit communicatively coupled to the first direct vacuum source and the second direct vacuum source, in which the control unit controls vacuum pressure supplied by the first direct vacuum source and the second direct vacuum source independently.

20 Claims, 4 Drawing Sheets

(56) References Cited

U.S. PATENT DOCUMENTS

| | | |
|---|---|---|
| 7,152,542 B2 | 12/2006 | Eben et al. |
| 7,174,839 B2 | 2/2007 | Tsing |
| 7,237,496 B2 | 7/2007 | Bettin et al. |
| 7,472,662 B2 | 1/2009 | Brueegen |
| 7,665,409 B2 | 2/2010 | Johnson |
| 7,938,073 B2 | 5/2011 | Dunham et al. |
| 8,322,293 B2 | 12/2012 | Wollenhaupt et al. |
| 8,336,469 B2 | 12/2012 | Preheim et al. |
| 8,371,240 B2 | 2/2013 | Wollenhaupt et al. |
| 8,942,896 B2 * | 1/2015 | Mayerle .............. A01C 7/102 111/185 |
| 2007/0266917 A1 * | 11/2007 | Riewerts ............ A01C 7/046 111/200 |
| 2012/0103238 A1 * | 5/2012 | Beaujot .............. A01C 7/06 111/174 |
| 2012/0260837 A1 | 10/2012 | Patwardhan et al. |

* cited by examiner

FIG. 6

DIRECT VACUUM SEED METERING SYSTEM AND METHOD

BACKGROUND

The present disclosure relates generally to seed planting implements and, more particularly, to seed meters used on seed planting implements.

Generally, planting implements (e.g., planters) are towed behind a tractor or other work vehicle via a mounting bracket secured to a rigid frame of the implement. These planting implements typically include multiple row units distributed across the width of the implement, which are used to deposit seeds at a desired depth beneath the soil surface, thereby establishing rows of planted seeds. More specifically, each row unit may include a seed meter that controls the rate and/or spacing of seeds deposited in the ground.

Often, planting implements may include as many as sixteen to twenty-four individual row units. However, along the width of the implement, operating conditions of each row unit may vary. For example, row units located in a central portion of the planting implement may have a different desired vacuum pressure as compared to row units located in outer portions of the planting implement. Additionally, in some embodiments, one group of row units may be used to deposit different types of seeds than another group of row units. For example, a first group of row units may plant a larger type of seed (e.g., corn) and a second group of row units may plant a smaller type of seed (e.g., soybean). As such, a remote/centralized vacuum system may make it difficult to account for the varying operating conditions.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a seed metering system that includes a first seed meter that controls seed deposition by a first row unit on a seed planting implement; a first direct vacuum source fluidly coupled to the first seed meter, in which the first direct vacuum source supplies vacuum pressure only to the first seed meter to enable the first seed meter to control seed deposition by the first row unit; a second seed meter that controls seed deposition by a second row unit on the seed planting implement; a second direct vacuum source fluidly coupled to the second seed meter, in which the second direct vacuum source supplies vacuum pressure only to the second seed meter to enable the second seed meter to control seed deposition by the second row unit; and a control unit communicatively coupled to the first direct vacuum source and the second direct vacuum source, in which the control unit controls vacuum pressure supplied by the first direct vacuum source and the second direct vacuum source independently.

A second embodiment describes a tangible, non-transitory, computer readable medium that stores instructions executable by a processor. The instructions comprise instructions to determine, using the processor, when a seed is expected to be output by a seed meter on a seed planting implement; determine, using the processor, whether the seed is actually output and number of seeds output when the seed is expected to be output; detect, using the processor, that a skip has occurred when the seed is not actually output; detect, using the processor, that a multiple has occurred when more than one seed is output; and instruct, using the processor, a direct vacuum source fluidly coupled only to the seed meter to adjust vacuum pressure supplied to the seed meter based at least in part on whether a skip or a multiple is detected.

A third embodiment describes method that includes detecting, using a control unit, abnormal operation of a first seed meter on a planting implement; automatically instructing, using the control unit, a first direct vacuum source that supplies vacuum pressure to the first seed meter to switch from supplying a first vacuum pressure to a second vacuum pressure when abnormal operation is detected, wherein the first vacuum pressure is a negative vacuum pressure and the second vacuum pressure is a positive vacuum pressure; and instructing, using the control unit, the first direct vacuum source to resume supplying the first vacuum pressure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed above, seed planting implements generally utilize multiple row units to plant rows of seeds in the ground. More specifically, each row unit may include a seed meter to control rate and/or spacing of the deposited seeds. However, since multiple row units may be utilized, the operating conditions experience by each row unit may vary, even along the same planting implement.

To help illustrate, in some embodiments, different seed meters may be used within different row units to plant different types of seeds with differing size, shape, and/or weight at the same time. For example, a first seed meter of a first row unit may control the planting of corn seeds and a second seed meter of a second row unit may control the planting of soybean seeds. As can be appreciated, the size and weight of corn seeds may be greater than soybean seeds.

Generally, seed meters utilize vacuum pressure to attach seeds to a rotating seed disc, which controls the rate at which seeds are output by the seed meter. As used herein, "vacuum pressure" is intended to describe a pressure differential from atmospheric pressure and not necessarily a true vacuum. In operation, the vacuum pressure to achieve the desired planting rate for each row unit may be different. More specifically, the vacuum pressure sufficient to enable proper planting of corn seeds may be too large for the planting of soybean seeds, and may cause multiple soybean seeds to be planted in the same location (e.g., a multiple), for example, because multiple seeds are attached to a single hole on the seed disc due to the excessive vacuum pressure. On the other hand, the vacuum pressure sufficient to enable proper planting of soybean seeds may be too small for planting corn seeds and may cause a seed not be planted when expected (e.g., a skip), for example, because a seeds is not attached to at least one of the holes on the seed disc due to the insufficient vacuum pressure.

Additionally, even when the same type of seed is being planted, it may still be difficult to provide a uniform vacuum pressure to each of the seed meters. To help illustrate, when a centralized vacuum source is employed to supply vacuum pressure to multiple seed meters, the vacuum pressure may vary between each of the seed meters. More specifically, seed meters closer to the vacuum source may receive greater vacuum pressure than seed meters farther from the vacuum source. As such, the seed meters closer to the vacuum source may experience more multiples and the seed meters farther from the vacuum source may experience more skips. Accordingly, the different operating conditions experience by each seed meter may result in inconsistent planting of seeds.

Thus, to improve the operation of a planting implement, techniques described herein increase the amount of control over operation of each individual seed meter. More specifically, in some embodiments, control over operation of a seed meter may be increased by including a direct vacuum source on the seed meter. As will be described in more detail below, the vacuum pressure provided by each direct vacuum source may be independently adjusted to increase or decrease vacuum pressure supplied to the respective seed meter. For example, when it is determined that a seed is not deposited when expected (e.g., a skip), the vacuum pressure supplied to the corresponding seed meter may be increased. On the other hand, when it is determined that multiple seeds are deposited when only one seed is expected (e.g., a multiple), the vacuum pressure to the corresponding seed meter may be decreased.

For example, in some embodiments, each seed meter on a planting implement may include its own direct vacuum source. In other words, each seed meter may be a self-contained device, thereby obviating additional plumbing to a centralized vacuum source. As such, the operation of each seed meter may be individually and independently adjusted by controlling the corresponding direct vacuum source. As will be described in more detail below, the techniques described herein may reduce energy consumption and enhance operational consistency, for example by reducing the number of skips and multiples, even when different types of seeds are planted by an implement at the same time.

Figure 1:
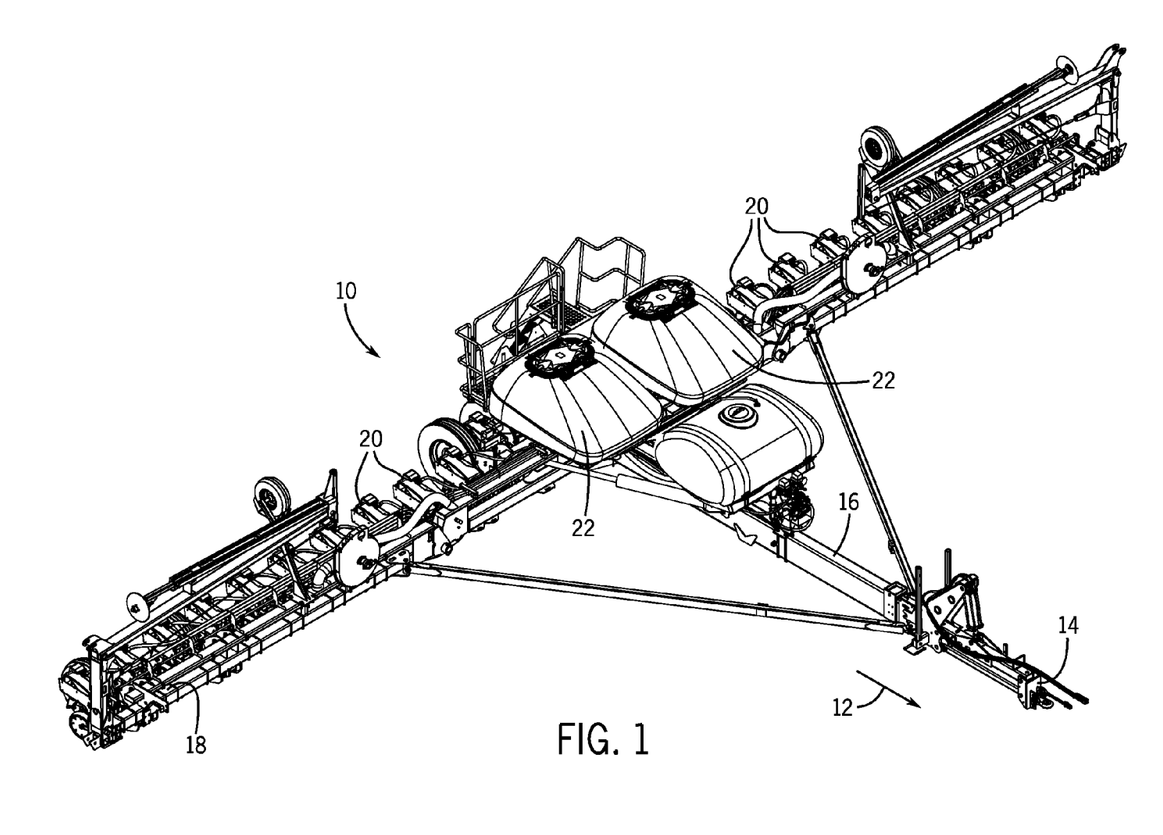
FIG. 1 is a perspective view of a planting implement configured to deposit seeds into a soil surface, in accordance with an embodiment.

To help illustrate, a planting implement 10 that may be used to deposit seeds into a soil surface is shown in FIG. 1. As depicted, the planting implement 10 includes a hitch assembly 14, a main frame assembly 16, a tool bar 18, row units 20, and seed tanks 22. In some embodiments, when a work vehicle is coupled to the implement 10 by the hitch assembly 14, the implement 10 may be towed along a direction of travel 12 by the work vehicle, such as a tractor or other prime mover.

As depicted, the hitch assembly 14 is coupled to the main frame assembly 16 and the main frame assembly 16 is coupled to the tool bar 18. Additionally, as depicted, the tool bar 18 is coupled to multiple row units 20. Thus, as the work vehicle tows the implement 10, each of the row units 20 may deposit seeds at a desired depth beneath the soil surface, thereby establishing rows of planted seeds. In some embodiments, the bulk of the seeds to be planted may be stored in the seed tanks 22. Thus, as seeds are planted by the row units 20, a pneumatic distribution system may distribute additional seeds from the seed tanks 22 to the individual row units 20.

It should be noted that while the illustrated implement 10 includes 24 row units 20, alternative implements may include more or fewer row units 20. For example, certain implements 10 may include 6, 8, 12, 16, 24, 32, or 36 row units, or more. In addition, the spacing between row units may be particularly selected based on the type of seed being planting. For example, the row units may be spaced 30 inches from one another for planting corn, and 15 inches from one another for planting soy beans.

Figure 2:
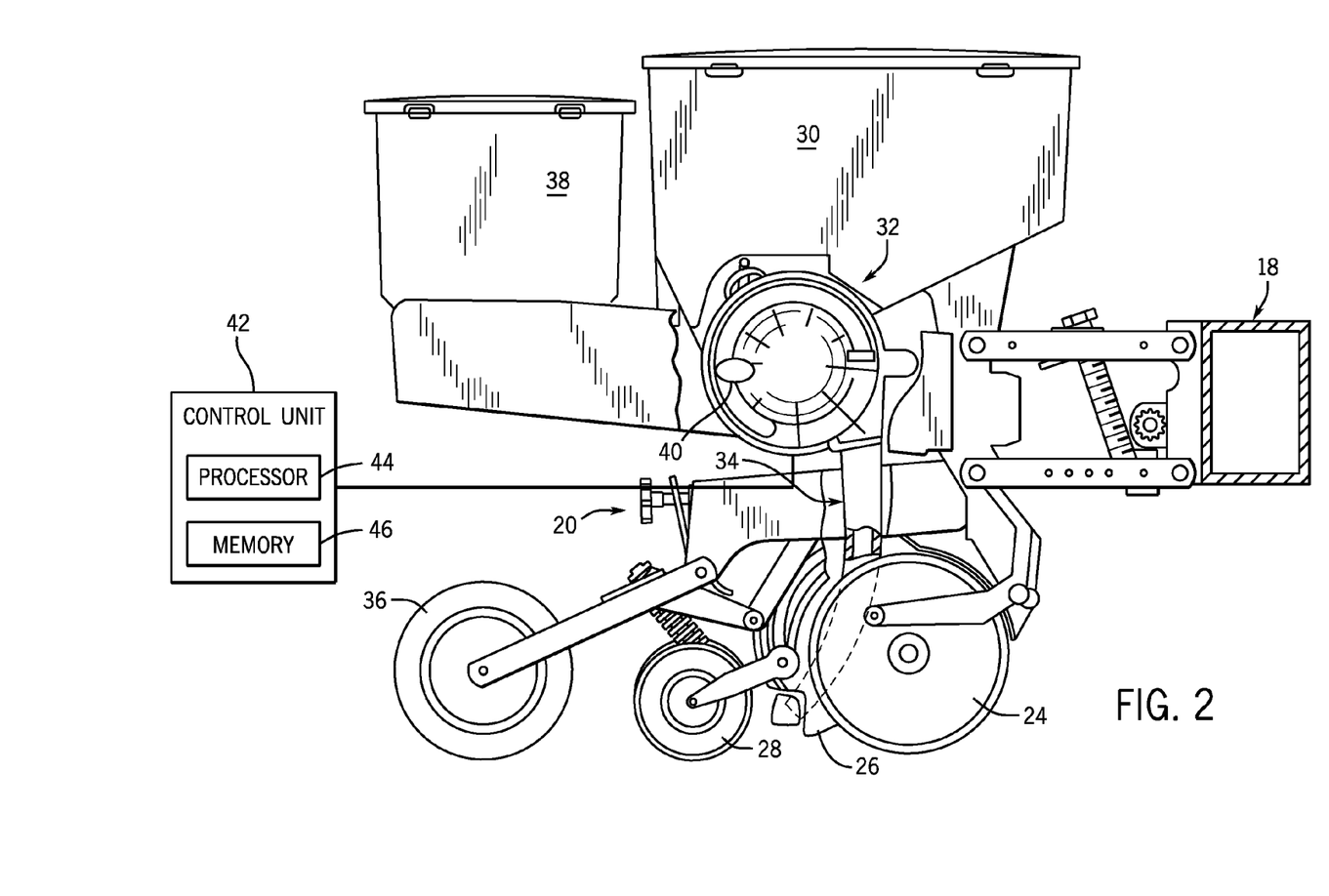
FIG. 2 is a side view of a row unit on the planting implement of FIG. 1, in accordance with an embodiment.

Once distributed, the seeds may be deposited in rows by the individual row units. To help illustrate, a row unit 20 that may be used to deposit seeds is shown in FIG. 2. As described above, the row unit 20 may deposit seeds as the planting implement 10 is towed by a work vehicle. As depicted, the row unit 20 is coupled to the tool bar 18. To facilitate depositing seeds, the row unit 20 includes a furrow opener disc 24, an opener shoe 26, a closing disc 28, a seed hopper 30, a seed meter 32, a seed tube 34, a press wheel 36, and an auxiliary hopper 38.

More specifically, as the row unit 20 travels along a field, the furrow opener disc 24 and the opener shoe 26 engage the soil and forms a trench for seeds to be deposited. In the depicted embodiment, the seeds received from the seed tanks 22 may be stored in the seed hopper 30 before they are deposited. From the seed hopper 30, the seeds are transferred into the seed meter 32. The seed meter 32 then outputs the seeds to the seed tube 34 such that the seeds travel down the seed tube 34 and into the trench. Once the seeds are deposited, the closer disc 28 covers the seeds and the press wheel 36 packs the soil over the deposited seeds.

As described above, the seed meter 32 controls the rate and/or spacing of the seeds by controlling the output of seeds from the seed meter 32 to the seed tube 34. In other words, the seed meter 32 enables the seeds to be planted at desired locations, for example, by reducing the possibility of multiple seeds being deposited in the same location (e.g., a multiple) or a seed not being planted in a desired location (e.g., a skip).

More specifically, as will be described in more detail below, the seed meter 32 may operate to output seeds using a vacuum source 40. The operation of the seed meter 32, and particularly the vacuum source 40, is controlled by a control unit 42. As depicted, the control unit 42 includes a processor 44 and memory 46. In some embodiments, the processor 44 may include one or more general purpose processors, one or more application specific integrated circuits, one or more field programmable gate arrays, or the like. Additionally, the memory 46 may be any tangible, non-transitory, computer readable medium that is capable of storing instructions executable by the processor 46 and/or data that may be processed by the processor 44. In other words, the memory 46 may include volatile memory, such as random access memory, or non-volatile memory, such as hard disk drives, read only memory, optical disks, flash memory, and the like.

Figure 3:
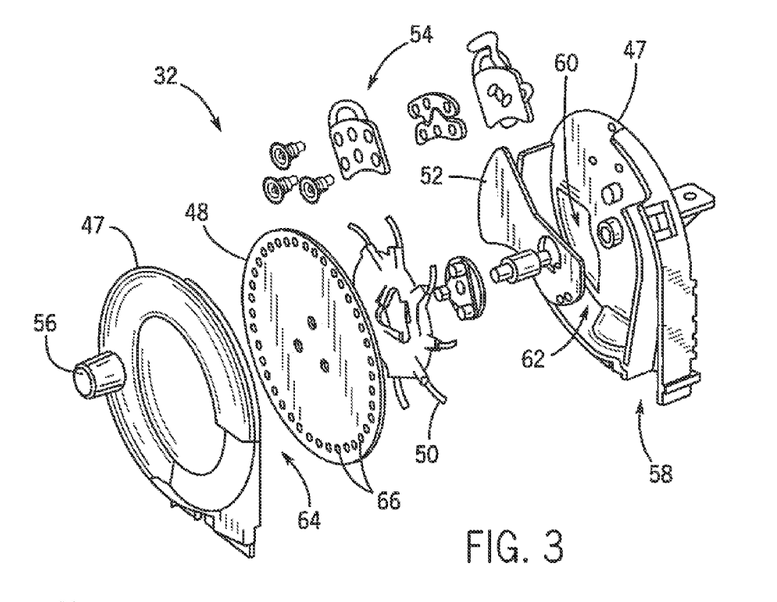
FIG. 3 is an exploded view of a seed meter used on the row unit of FIG. 2, in accordance with an embodiment.

To help illustrate how the seed meter 32 may regulate the rate and/or spacing of the deposited seeds, an exploded view of the seed meter 32 is shown in FIG. 3. As depicted, the seed meter 32 includes a housing 47, a seed disc 48, an agitator 50, a seed baffle 52, a singulator 54, a vacuum port 56, a seed output port 58, and a seed input port 60. More specifically, the seed disc 48 may divide the seed meter between a seed chamber 62 and a vacuum chamber 64.

In operation, seeds may be received from the seed hopper 30 via the seed input port 60 and stored in the seed chamber 62. In some embodiments, the amount of seeds stored in the seed chamber 62 may be controlled using the baffle 52. More specifically, the baffle 52 may control the area of the seed input port 60 by blocking a portion of the see input port 60, thereby controlled seed flow from the seed hopper 30 into the seed chamber 62. Once in the seed chamber 62, the agitator 50 rotates to agitate the seeds and to reduce seed clumping.

To output seeds from the seed meter 32, a vacuum source 40 is coupled to the vacuum port 56. In some embodiments, the vacuum source 40 may create a negative pressure (e.g., a pressure lower than atmospheric pressure) in the vacuum chamber 64, which causes seeds from the seed chamber 58 to attach to openings 66 on the seed disc 48. In other embodiments, a positive pressure (e.g., a pressure higher than atmospheric pressure) in the vacuum chamber 64 may be established to attach seeds to the openings in the seed disc 48. In any case, the seeds may be attached to and rotate with the seed disc 48. As the seed disc 48 rotates, the singulator 54 may remove the seeds from the seed disc 48 so that the seeds are output from the seed output port 58. For example, the singulator 54 may selectively block the vacuum pressure to dislodge the seeds from the seed disc openings 66.

As discussed above, the seed meter 32 may operate to regulate the spacing of seeds by controlling the rate at which seeds are output. As will be appreciated, it is desirable that a seed is output only when expected. For example, controlling seed output may include reducing the possibility of outputting multiple seeds when a single seed is expected (e.g., a multiple) and of outputting no seed when a seed is expected (e.g., a skip). As such, in some embodiments, a sensor may be included in the singulator 54 or in the seed tube 34 to determine when a seed is being output and/or the number of seeds being out. More specifically, as will be described in more detail below, the sensor may facilitate detecting when a multiple and/or a skip occurs.

In some embodiments, a multiple may occur when more than one seed is attached to a single seed disk opening 66. On the other hand, a skip may occur when no seeds are attached to a seed disk opening 66. Generally, multiples may occur more frequently when the vacuum pressure is higher because the vacuum pressure may be sufficient to hold multiple seeds to the opening 66. On the other hand, skips may occur more frequently when the vacuum pressure is lower because the vacuum pressure may be insufficient to secure a single seed. In other words, the vacuum pressure generated by the vacuum source 40 may be adjusted to a desired pressure to substantially decrease the occurrence of both multiples and skips.

As discussed above, a planting implement 10 includes multiple row units 20, which may each experience different operating conditions. As such, because the operating conditions for row unit 20 may vary, the desired pressure for each corresponding seed meter 32 may also vary. For example, if a first seed meter is used to facilitate the planting of corn seeds and a second seed meter is used to facilitate the planting of soybean seeds, the desired pressure for the first seed meter may be different from the desired pressure for the second seed meter. More specifically, the desired pressure for the first seed meter may be greater because corn seeds are generally larger and heavier than soybean seeds.

Accordingly, it would be beneficial to individually and independently control operation of each seed meter 32. One technique described herein utilizes a direct vacuum source for each seed meter 32. To help illustrate, embodiments of a seed meter 32 with a direct vacuum source 68 are show in FIGS. 4A and 4B. More specifically, a first embodiment of a direct vacuum source 68A is shown in FIG. 4A and a second embodiment of a direct vacuum source 68B is shown in FIG. 4B.

Figures 4A, 4B:
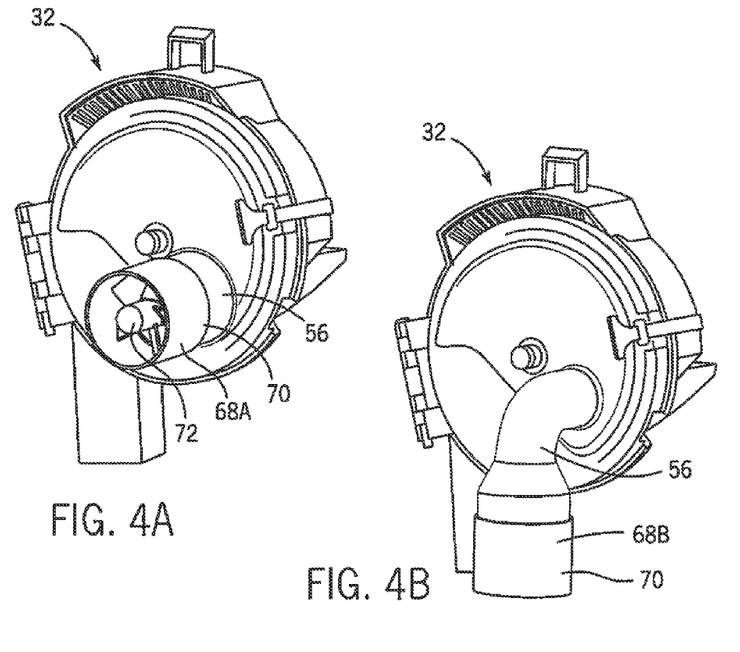
FIG. 4A is a perspective view of the seed meter of FIG. 3 with an embodiment of a direct vacuum source, in accordance with an embodiment.
FIG. 4B is a perspective view of the seed meter of FIG. 3 with another embodiment of a direct vacuum source, in accordance with an embodiment.

As depicted in FIG. 4A, the direct vacuum source 68A includes a housing 70 and a fan 72. In the depicted embodiment, the housing 70 is coaxial with and extends outwardly from the vacuum port 56. Thus, in some embodiments, the housing 70 may be molded with the seed meter housing 47. In such embodiments, the process for forming the housings 56 and 70 is substantially the same as the process for forming a housing configured to interface with a remote/centralized vacuum source. For example, the vacuum port 56 may simply be elongated. In fact, in some embodiments, the direct vacuum source 68A may be disposed within a vacuum port 56 of a housing configured to interface with a remote/centralized vacuum source.

Additionally, in other embodiments, the direct vacuum source 68A may be retrofitted to existing seed meters 32. For example, the housing 70 may secure the direct vacuum source 68 to an outer surface of the vacuum port 56, or an existing housing 70 may be replaced with a new housing 70, which includes the direct vacuum source 68. Thus, a direct vacuum source 68 may be implemented with few modifications to existing seed meters.

Additionally, the implementation of a direct vacuum source is not limited to the embodiment described in FIG. 4A. Instead, an alternate location of the direct vacuum source 68 may be selected, and modifications to the vacuum port 56 or the housing 70 may be made to accommodate the alternate location. To help illustrate, FIG. 4B shows a direct vacuum source 68B that is implemented in a downward facing direction. As described above, the housing 70 may be molded so that it is integral with the vacuum port 56, or the housing 70 may be retrofitted onto an existing seed meter 32. Thus, in other embodiments, the vacuum source 68 may be positioned to face other directions (e.g., up, down, forward, or backward).

In fact, the ability to select the position and direction of the direct vacuum source 68 may enable seed meters 32 to conform to changing regulations. For example, regulations may specific that a vacuum source be a certain distance (e.g., 20 inches) from the ground. To comply with this regulation, a retrofitted direct vacuum source housing 70 and/or a new seed meter housing 47 may be employed to the position the vacuum source in the desired position. Moreover, even if the regulations change, for example by specifying that the vacuum source point in the backward direction, the existing seed meters may again be modified to comply with the new regulations simply by retrofitting a different direct vacuum source housing 70 or a different seed meter housing 47.

In each configuration, the direct vacuum source 68 may be functionally similar. More specifically, as described above, the vacuum source creates a vacuum pressure in the vacuum chamber 64 to attach seeds to the seed disc 48. To generate the vacuum pressure with the direct vacuum source 68, the fan 72 in the direct vacuum source 68 rotates. More specifically, the fan 72 may create a negative pressure in the vacuum chamber 64 by blowing air out of the seed meter 32 and a positive pressure in the vacuum chamber 64 by drawing air into the seed meter 32. As can be appreciated, the magnitude of the vacuum pressure may depend on the volume of air being displaced by the fan 72. In other words, the vacuum pressure may depend at least in part on the speed of the fan 72 and/or the pitch of the fan blades.

In some embodiments, the vacuum pressure in the seed meter 32 may be controlled by controlling the speed of the fan 72. For example, to increase the vacuum pressure, the speed of the fan 72 may be increased, and to decrease the vacuum pressure, the speed of the fan 72 may be decreased. In other embodiments, the vacuum pressure in the seed meter 32 may be controlled by controlling the pitch of the fan blades. More specifically, the fan 72 may rotate at a constant speed while the pitch of the fan blades is adjusted. For example, to increase vacuum pressure the pitch of the fan blades may be adjusted to displace a larger amount of air. In fact, this may enable the vacuum pressure to be adjusted at a faster rate since the speed of the fan 72 may remain constant (e.g., not need to "spool").

Furthermore, in some embodiments, the type of vacuum pressure generated may be controlled by controlling the direction of the fan. For example, to generate a negative vacuum pressure, the fan 72 may rotate a first direction and, to generate a positive vacuum pressure, the fan may rotate a second (e.g., opposite) direction. As will be described in more detail below, the ability to generate different polarity vacuum pressures may facilitate the clearing of seed clumps in the seed chamber 62. In other embodiment, the type of vacuum pressure may be controlled by controlling the pitch of the fan blades. For example, to generate a negative vacuum pressure, the fan blades may face a first direction to displace air from the seed meter 32 and, to generate a positive vacuum pressure, the fan blades may face a second direction to blow air into the seed meter 32. In other words, the polarity of the vacuum pressure may be changed simply by changing the pitch of the fan blades, even while the fan 72 maintains the same speed.

More specifically, the operation (e.g., speed, blade pitch and/or direction) of the fan 72 may be controlled by the control unit 42. The control unit 42 may control operation of a single fan 72 or multiple fans. In either configuration, the fan 72 on each seed meter 32 may be individually and independently controlled. Accordingly, each seed meter 32 is a self-contained device, which does not utilize additional plumbing to connect to a remote/centralized vacuum source. To help illustrate, continuing with the example described above, the fan 72 in the first seed meter may rotate at a higher speed to accommodate the larger and heavier corn seeds, and the fan 72 in the second seed meter may rotate at a lower speed to accommodate the smaller and lighter soybean seeds.

Thus, any suitable type of fan 72 that can generate vacuum pressure may be utilized, such as an electric fan, a gear drive fan, a hydraulic fan, or the like. Regardless of the type of fan 72 used, energy is generally utilized to drive the fan 72. Accordingly, the ability to individually and independently control the direct vacuum source 68 additionally enables energy consumption to be reduced. To help illustrate, continuing with the above example, it may be possible to achieve the desired one seed to one seed disc opening 66 ratio by utilizing the same vacuum pressure in both the first seed meter and the second seed meter. However, since the soybean seeds may be smaller and lighter, a lower vacuum pressure may be utilized in the second seed meter while still achieving the desired one to one ratio. In other words, the fan 72 may rotate slower, which reduces energy consumption.

Additionally, the direct vacuum source 68 may improve the ability to individually and independently each row unit 20, for example, to enable the desired seed output rate to differ between the row units 20. To help illustrate, when the planting implement 10 is turning, row units 20 closer to the turn may travel a shorter distance than row units 20 further from the turn. Accordingly, to maintain uniform spacing of seeds between the rows, it may be desirable for the row units 20 closer to the turn to deposit seeds at a slower rate than the row units 20 further from the turn. As described above, the seed deposition rate of each row unit 20 may be controlled based at least in part on rational speed of the seed disc 48. In other words, the seed discs 48 included in the row units 20 closer to the turn may be actuated slower than the seed discs 48 included in the row units 20 further from the turn.

However, the rotational speed of the seed disc 48 may affect the desired vacuum pressure of the seed meter 32. For example, when a seed disc 48 is rotating faster, it may be desirable to utilize a higher vacuum pressure to improve the likelihood of the desired seed output (e.g., reduce the possibility of skips) since there is less time to secure the seeds to the seed disc openings 66. On the other hand, when the seed disc 48 is rotating slower, it may be possible to utilize a lower vacuum to achieve the desired seed output while minimizing energy consumption. As such, the ability to individually and independently control vacuum pressure supplied to each seed meter 32 using direct vacuum sources 68 may be particularly useful when the desired seed output rate varies between the seed meters 32, for example, when the planting implement 10 is turning.

Figure 5:
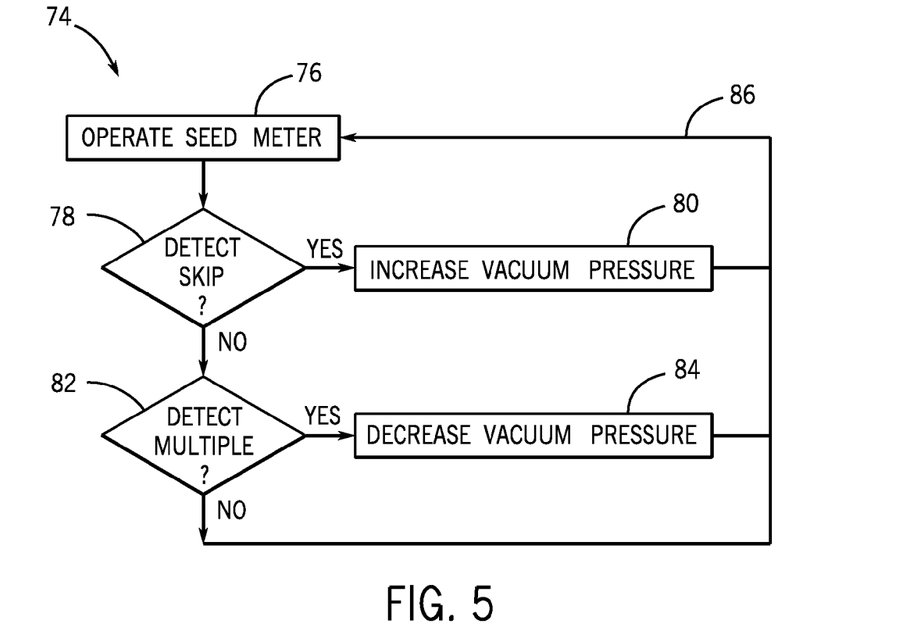
FIG. 5 is a flow diagram of a process for control a direct vacuum source on a seed meter, in accordance with an embodiment.

Accordingly, utilizing a direct vacuum source 68 may improve consistency of a seed meter 32 (e.g., reduce multiples and skips) and reduce energy consumption of the seed meters 32. More specifically, the improved consistency and reduced energy consumption may be enabled by the ability to individually and independently control operation of each direct vacuum source 68. To help illustrate, a flow chart of one embodiment of a process 74 for controlling operation of each direct vacuum source 68 is shown in FIG. 5.

Generally the process 74 includes operating the seed meter (process block 76), determining whether a skip is detected (decision block 78), when a skip is detected, increasing vacuum pressure (process block 80), determining whether a multiple is detected (decision block 82), and when a multiple is detected, decreasing vacuum pressure (process block 84). In some embodiments, process 74 may be implemented by instructions stored on a tangible, non-transitory, computer readable medium, such as memory 46, and executable by processing circuitry, such as processor 44.

Accordingly, in some embodiments, the control unit 42 may instruct the seed meter 32 to operate and output seeds (process block 76). More specifically, the control unit 42 may instruct the baffle 52 to adjust the size of the seed input port 60. Additionally, the control unit 42 may instruct the seed disc 48 and the agitator 50 to rotate to provide seeds at a desired rate and to reduce seed clumping.

Furthermore, the control unit 42 may instruct the direct vacuum source 68 to provide vacuum pressure such that seeds are attached to the seed disc openings 66. More specifically, the control unit 42 may instruct the direct vacuum source 68 to supply a specific desired vacuum pressure. In some embodiments, when the seed meter 32 initially begins operation, the control unit 42 may instruct the direct vacuum source 68 to supply a default or predetermined vacuum pressure. However, during operation, the control unit 42 may instruct the direct vacuum source 68 to dynamically adjust the supplied vacuum pressure, for example, by increasing or decreasing speed of the fan 72. In some embodiments, the default vacuum pressure and the adjusted vacuum pressure may be stored in the memory 46 and/or based on instructions stored in memory 46.

Once the seed meter 32 is in operation, the control unit 42 may detect whether a seed is not being output when expected (e.g., a skip) (decision block 78). More specifically, a sensor, located in the singulator 54 or in the seed tube, may communicate with the control unit 42 when seeds are output from the seed meter 32. Additionally, the control unit 42 may determine when a seed is expected to be output by the seed meter 32. In some embodiments, the expected seed output may be based on a user specified seed spacing, the type of seed disc 48, a desired output rate, size of the seed disc 48, type of seeds, or any combination thereof. As such, each time a seed is expected to be output, the control unit 42 may poll the sensor to determine if a seed is actually output.

When a skip is detected, the control unit 42 may instruct the direct vacuum source 68 to increase the supplied vacuum pressure (process block 80). More specifically, the control unit 42 may instruct the fan 72 to displace a larger volume of air, for example, by rotating at a higher speed and/or changing fan blade pitch.

In some embodiments, the control unit 42 may instruct the fan 72 to make an incremental increase in vacuum pressure, which may be predefined and stored in the memory 46. In other embodiments, the control unit 42 may determine the amount of vacuum pressure increase that is sufficient to reduce skipping. For example, the control unit 42 may determine the number of skips that occur over a given period, such as a specific number of seeds dispensed or a number of rotations of the seed disc 48. Based on the number of skips that occur over that period, the control unit 42 may determine an appropriate vacuum pressure increase.

In other words, the control unit 42 may instruct the direct vacuum source 68 to increase vacuum pressure after each detected skip or alternatively after a given period of operation. In either case, the seed meter 32 may continue operation with the increased vacuum pressure (arrow 86).

On the other hand, when no skip is detected, the control unit 42 may detect whether multiple seeds are being output when a single seed is expected (e.g., a multiple) (decision block 82). More specifically, as discussed above, the sensor may output a signal indicative of the number of seeds output from the seed meter 32 to the control unit 42. Additionally, the control unit 42 may determine when a seed is expected to be output by the seed meter 32, for example, based on a user specified seed spacing, the type of seed disc 48, a desired output rate, size of the seed disc 48, type of seeds, or any combination thereof. As such, each time a seed is expected to be output, the control unit 42 may poll the sensor to determine the number of seeds that are actually output.

When a multiple is detected, the control unit 42 may instruct the direct vacuum source 68 to decrease the supplied vacuum pressure (process block 84). More specifically, the control unit 42 may instruct the fan 72 to displace a smaller volume of air, for example, by rotating at a lower speed and/or changing fan blade pitch.

Similar to increasing the vacuum pressure, the control unit 42 may instruct the fan 72 to make an incremental decrease in vacuum pressure, which may be predefined and stored in the memory 46. In other embodiments, the control unit 42 may determine the amount of vacuum pressure decrease that is sufficient to reduce multiples. For example, the control unit 42 may determine the number of multiples that occur over a given period, such as a specific number of seeds dispensed or a number of rotations of the seed disc 48. Based on the number of multiples that occur over that period, the control unit 42 may determine an appropriate vacuum pressure decrease.

In other words, the control unit 42 may instruct the direct vacuum source 68 to decrease vacuum pressure after each detected multiple or alternatively after a given period of operation. In either case, the seed meter 32 may continue operation with the decreased vacuum pressure (arrow 86).

Thus, the process 74 enables the seed meter 32 to be controlled by controlling the vacuum pressure supplied via the direct vacuum source 68. As such, expanding process 74 to each seed meter 32 on a planting implement 10 enables each of the seed meters 32 to be individually and independently controlled. More specifically, each seed meter 32 may be controlled so that a desired vacuum pressure is supplied, which enables improved consistency (e.g., reduced skips and/or multiples) and reduced power consumption across the planting implement 10.

Figure 6:
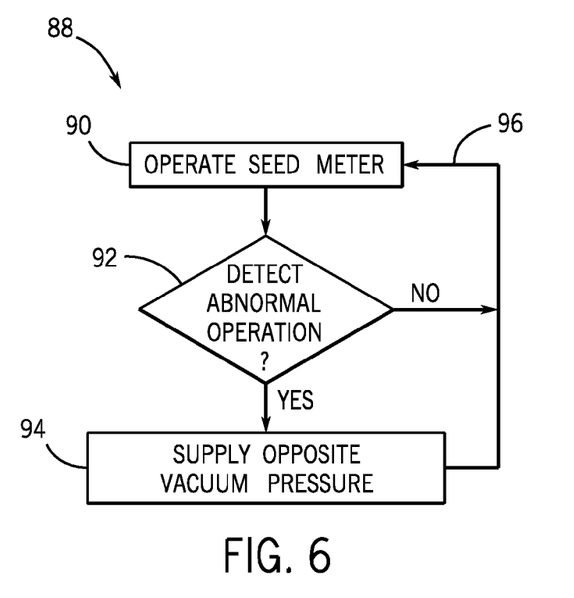
FIG. 6 is a flow diagram of a process for addressing an abnormal operating condition in a seed meter, in accordance with an embodiment.

Moreover, since the vacuum pressure supplied to each seed meter 32 may be independently and individually controlled, additional functionality may be added to the seed meter 32. For example, an opposite vacuum pressure may supplement the agitator 50 to dislodge clumped seeds. To help illustrate, a flow chart of a process 88 for supplying an opposite vacuum pressure is shown in FIG. 6. Generally, the process 88 includes operating the seed meter (process block 90), determining whether abnormal operation is detected (decision block 92), and when abnormal operation is detected, supplying an opposite vacuum pressure (process block 94). In some embodiments, the process 88 may be implemented by instructions stored on a tangible, non-transitory, computer readable medium, such as the memory 46, and executable by processing circuitry, such as the processor 44.

Accordingly, in some embodiments, similar to process block 76, the control unit 42 instructs the seed meter 32 to operate and to output seeds (process block 90). More specifically, the control unit 42 may instruct the baffle 52 to adjust the size of the seed input port 60, the seed disc 48 and the agitator 50 to rotate, and the direct vacuum source 68 to provide vacuum pressure such that seeds are attached to the seed disc openings 66. As described above, in some embodiments, the vacuum pressure may be negative so that the vacuum pressure draws the seeds into place on the seed disc openings 66. To simplify the following discussion, the seed meter 32 utilizes a negative vacuum pressure during normal operation.

Once the seed meter 32 is in operation, the control unit 42 detects abnormal operation (decision block 92). As used herein, abnormal operation is intended to describe a state in which maintenance may be desired. In other words, abnormal operation is not intended to describe a skip or a multiple because these conditions can generally be remedied by adjusting vacuum pressure. However, persistent skips and/or multiples, and/or unpredictable skips and/or multiples may be an indication of abnormal operation. Accordingly, to facilitate detecting abnormal operation, the control unit 42 may keep track of the number of skips and/or multiples, as well as the vacuum pressures supplied.

For example, when skips continue to occur even after the vacuum pressure is increased above a threshold amount, which may be a predetermined vacuum pressure that is sufficient to attach a certain seed type to the seed disc openings 66, the control unit 42 may determine that seed clumping is occurring in the seed chamber 62 and/or the seed input port 60. Similarly, the control unit 42 may also determine that seed clumping is occurring when the output from the seed meter 32 includes a mixture of multiples and skips.

To further illustrate, since a particular type of seed typically has relatively uniform weight and size, vacuum pressure is generally not constantly adjusted. As such, when frequent vacuum pressure adjustment is detected, the control unit 42 may determine that the skips and/or multiples are not a result of incorrect vacuum pressure. Instead, the control unit 42 may determine that the abnormal operation is caused by an abnormal condition the seed meter 32, for example, an obstructed seed disc 48, an obstructed agitator 50, an obstructed singulator 54, an obstructed seed output port 58, an obstructed seed disc opening 66, or any combination thereof.

Accordingly, to facilitate detecting abnormal operation, the control unit 42 may keep track of the number and occurrence of skips and multiples, as well as the magnitude and number of vacuum pressure adjustments. In some embodiments, such information may be stored in the memory 46 and correlated by the processor 44 to determine when abnormal operation is present. When abnormal operation is not detected, the control unit 42 instructs the seed meter 32 to continue normal operation (arrow 96). Generally, normal operation includes instructing the seed meter 32 to output seeds and instructing the direct vacuum source 68 to adjust vacuum pressure when desired.

On the other hand, when abnormal operation is detected, the control unit 42 may instruct the direct vacuum source 68 to supply an opposite vacuum pressure (process block 94). For example, when negative vacuum pressure is used to attach seeds to the seed disc openings 66, the control unit 42 may instruct the direct vacuum source 68 to supply a positive vacuum pressure. More specifically, the opposite (e.g., positive) vacuum pressure may be supplied in an attempt to correct the abnormal operation. For example, if the abnormal operation is cause by seed clumping, the positive vacuum pressure may break up the clumping. Additionally, if the abnormal operation is caused by an obstruction, such as a seed lodged between the seed disc 66 and the seed meter housing 47, the positive vacuum pressure may dislodge the obstruction.

Thus, supplying the opposite vacuum pressure may enable the seed meter 32 to automatically resolve some causes of abnormal operation. In other words, the rest of the planting implement 10 may continue normal operation while one or more of the seed meters 32 attempts to alleviate abnormal operation. Thus, the operation of the planting implement 10 as a whole may be improved because stopping the implement upon detection of an abnormal operation of one seed meter 32 is obviated. In certain embodiments, the seed meter 32 may first try to automatically solve the abnormal operation before alerting the operator, for example, after a specific number of failed attempts.

As can be appreciated, when an opposite vacuum pressure is supplied, the seed meter 32 may not operate to meter seeds. More specifically, the opposite vacuum pressure drives seeds away from the seed disc openings 66, and thus terminates seed output. Additionally, the opposite vacuum pressure may cause the seeds in the seed chamber 62 to move in an unpredictable manner, and thus, may even cause seeds to be unexpectedly expelled.

As such, it may be desirable to supply an opposite vacuum pressure to a seed meter 32 experiencing from abnormal operation, but not to a seed meter 32 that is operating normally. More specifically, the ability to individually and independently control each direct vacuum source 68 enables selective application of opposite vacuum pressure to only seed meters 32 experiencing abnormal operation, and not to seed meters 32 operating normally. In other words, instead of ceasing normal operation for all seed meters 32, operation of only the seed meters 32 experiencing from abnormal operation is disturbed (e.g., by supplying the opposite vacuum pressure), while the other seed meters 32 continue normal operation.

Thus, operational efficiency of the planting implement 10 as a whole may be improved. More specifically, although supplying the opposite vacuum pressure may disrupt the function of one row unit 20 functioning abnormally, the remaining row units 20 may continue planting seeds. In fact, when the opposite vacuum pressure is able to alleviate the abnormal operation (e.g., by dislodging an obstruction or breaking a seed clump), the control unit 42 instructs the seed meter 32 to resume normal operation (arrow 96). Thus, even when a seed meter 32 is experiencing abnormal operation, the seed meter 32 may quickly be returned to normal operation.

Moreover, in some embodiments, the control unit 42 may diagnose the abnormal operation based on the number of attempts to correct the abnormal operation. For example, if several attempts are made to alleviate the abnormal operation by supplying opposite vacuum pressure, the control unit 42 may determine that operator maintenance is desired. Accordingly, the control unit 42 may notify the operator using an auditory alarm, an indicator light, a displayed message, or the like.

Accordingly, embodiments described herein may provide the technical benefit of improving operation of a seed meter and a planting implement as a whole. More specifically, each seed meter may include a corresponding direct vacuum source, which enables the vacuum pressure supplied to the seed meter to be individually and independently controlled. For example, the vacuum pressure supplied to a seed meter may be increased when a skip is detected and may be decreased when a multiple is detected. As such, the operational consistency of each seed meter may be improved by reducing the occurrence of skips and multiples. Additionally, energy consumption may be reduced. Furthermore, the use of a direct vacuum source enables additional functionality in a seed meter. For example, an opposite (e.g., positive) vacuum pressure may be supplied to break up seed clumping or to dislodge an obstruction.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seed metering system comprising;
a first seed meter configured to control seed deposition by a first row unit on a seed planting implement;
a first direct vacuum source fluidly coupled to the first seed meter, wherein the first direct vacuum source is configured to supply vacuum pressure only to the first seed meter to enable the first seed meter to control seed deposition by the first row unit;
a second seed meter configured to control seed deposition by a second row unit on the seed planting implement;
a second direct vacuum source fluidly coupled to the second seed meter, wherein the second direct vacuum source is configured to supply vacuum pressure only to the second seed meter to enable the second seed meter to control seed deposition by the second row unit; and
a control unit communicatively coupled to the first direct vacuum source and the second direct vacuum source, wherein the control unit is configured to control vacuum pressure supplied by the first direct vacuum source and the second direct vacuum source independently.

2. The seed metering system of claim 1, wherein the control unit is configured to:
instruct the first direct vacuum source to supply a first desired vacuum pressure to reduce skips and multiples output by the first seed meter; and
instruct the second direct vacuum source to supply a second desired vacuum pressure to reduce skips and multiples output by the second seed meter;
wherein the first desired vacuum pressure is different from the second desired vacuum pressure.

3. The seed metering system of claim 2, comprising a sensor configured to determine when a seed is output by the first seed meter;
wherein the control unit is configured to
receive an indication from the sensor when a seed is output;
detect that a skip has occurred when a seed is not output when expected;
determine the first desired vacuum pressure based on the detected skip; and
instruct the first direct vacuum source to increase vacuum pressure to the first desired vacuum pressure.

4. The seed metering system of claim 2, comprising a sensor configured to determine a number of seeds output by the first seed meter within a selected time frame;
wherein the control unit is configured to:
receive an indication from the sensor regarding the number of seeds output within the selected time frame;
detect that a multiple has occurred when multiple seeds are output within the selected time frame;
determine the first desired vacuum pressure based on the detected multiple; and
instruct the first direct vacuum source to decrease vacuum pressure to the first desired vacuum pressure.

5. The seed metering system of claim 2, wherein the first direct vacuum source comprises a fan and the control unit is configured to instruct the first direct vacuum source to supply the first vacuum pressure by controlling speed of the fan.

6. The seed metering system of claim 1, wherein the first seed meter is configured to output a first type of seed and the second seed meter is configured to output a second type of seed, wherein the first type of seed and the second type of seed have different size, weight, shape, or any combination thereof.

7. The seed metering system of claim 1, wherein the first seed meter comprises a vacuum port and the first direct vacuum source is molded to the vacuum port.

8. The seed metering system of claim 1, wherein the first direct vacuum source faces a downward direction.

9. A tangible, non-transitory, computer readable medium configured to store instructions executable by a processor, wherein the instructions comprise instructions to:
determine, using the processor, when a seed is expected to be output by a seed meter on a seed planting implement;
determine, using the processor, whether the seed is actually output and number of seeds output when the seed is expected to be output;
detect, using the processor, that a skip has occurred when the seed is not actually output;
detect, using the processor, that a multiple has occurred when more than one seed is output; and
instruct, using the processor, a direct vacuum source fluidly coupled only to the seed meter to adjust vacuum pressure supplied to the seed meter based at least in part on whether a skip or a multiple is detected.

10. The computer readable medium of claim 9, wherein the instructions to instruct the direct vacuum source comprise instructions to instruct the direct vacuum source to increase vacuum pressure supplied when a skip is detected.

11. The computer readable medium of claim 9, wherein the instructions to instruct the direct vacuum source comprise instructions to instruct the direct vacuum source to decrease vacuum pressure supplied when a multiple is detected.

12. The computer readable medium of claim 9, comprising instructions to:
determine number of skips and multiples that occur over a period of operation of the seed meter; and
calculate amount to adjust the vacuum pressure based at least in part on the number skips that occur, the number of multiples that occur, or both.

13. The computer readable medium of claim 12, wherein the period of operation comprises a rotation of a seed disc in the seed meter.

14. The computer readable medium of claim 9, wherein the seed planting implement comprises a plurality of seed meters each with supplied vacuum pressure from a separate direct vacuum source.

15. A method comprising:
detecting, using a control unit, abnormal operation of a first seed meter on a planting implement;
automatically instructing, using the control unit, a first direct vacuum source that supplies vacuum pressure to the first seed meter to switch from supplying a first vacuum pressure to a second vacuum pressure when abnormal operation is detected, wherein the first vacuum pressure is a negative vacuum pressure and the second vacuum pressure is a positive vacuum pressure; and instructing, using the control unit, the first direct vacuum source to resume supplying the first vacuum pressure.

16. The method of claim 15, wherein detecting the abnormal operation comprises determining a number of skips and multiples that occur over a period of operation of the seed meter.

17. The method of claim 15, wherein detecting the abnormal operation comprises determining a number and magnitude of vacuum pressure adjustments made by the first direct vacuum source.

18. The method of claim 15, comprising instructing a second direct vacuum source to supply a third vacuum pressure to a second seed meter on the planting implement while the first vacuum source supplies the first vacuum pressure and the second vacuum pressure, wherein the third vacuum pressure is a negative vacuum pressure different from the first vacuum pressure.

19. The method of claim 15, wherein the first vacuum pressure is supplied when blades of a fan in the direct vacuum source face a first direction, and the second vacuum pressure is supplied when the blades face a second direction, opposite the first direction.

20. The method of claim 15, wherein the first vacuum pressure is supplied when a fan in the direct vacuum source rotates in a first direction, and the second vacuum pressure is supplied when the fan rotates in a second direction, opposite the first direction.

* * * * *